United States Patent [19]

Stark-Kasley et al.

[11] Patent Number: 5,421,866
[45] Date of Patent: Jun. 6, 1995

[54] WATER REPELLENT COMPOSITIONS

[75] Inventors: Lori A. Stark-Kasley, Midland; Paul J. Popa, Auburn; Thomas M. Gentle, Midland; Dale E. Hauenstein, Midland; Linda D. Kennan, Midland, all of Mich.

[73] Assignee: Dow Corning Corporation, Midland, Mich.

[21] Appl. No.: 242,982

[22] Filed: May 16, 1994

[51] Int. Cl.$^6$ .................................................. C09K 3/18
[52] U.S. Cl. ........................................ 106/2; 106/270; 106/287.11; 106/287.14; 106/285; 524/804
[58] Field of Search ..................... 524/804; 106/2, 270, 106/287.11, 287.14, 285

[56] References Cited

U.S. PATENT DOCUMENTS

| | | | |
|---|---|---|---|
| 5,073,195 | 12/1991 | Cuthbert | 106/2 |
| 5,205,860 | 4/1993 | Narula | 106/2 |
| 5,209,775 | 5/1993 | Bank | 106/2 |
| 5,300,327 | 5/1994 | Stark-Kasley | 427/387 |

Primary Examiner—Mark L. Bell
Assistant Examiner—C. M. Bonner
Attorney, Agent, or Firm—Alexander Weitz

[57] ABSTRACT

An aqueous emulsion composition suitable for treating cellulosic or masonry surfaces to render them water repellent is disclosed, said composition comprising:
  (i) an alkoxysilane of the formula $$R_nSi(OR')_{4-n}$$

wherein R is an alkyl radical, an alkenyl radical, phenyl, chloropropyl or trifluoropropyl, n is 1 or 2 and R' is an alkyl radical having 1 to 6 carbon atoms;
  (ii) a silane coupling agent of the formula $$R''_mR'''_pSi(OR')_{4-m-p}$$

wherein R" is selected from the group consisting of amino and quaternary ammonium organofunctional groups, R''' is an alkyl radical having 1 to 4 carbon atoms, R' has its previously defined meaning, m is 1 or 2 and p is 0 or 1, with the proviso that m+p is 2 or less and the molar ratio of said alkoxysilane (i) to said silane coupling agent (ii) is 0.5:1 to 3:1; and (iii) a polyisobutylene polymer, and preferred emulsions of the invention further comprising a wax component.

20 Claims, No Drawings

WATER REPELLENT COMPOSITIONS

FIELD OF THE INVENTION

This invention is directed to the treatment of cellulosic and masonry surfaces, and more particularly to the use of certain organosilicon compounds in combination with polyisobutylene, and preferably a wax, in order to render such surfaces water repellent.

BACKGROUND OF THE INVENTION

In U.S. Pat. No. 5,073,195 to Cuthbert et al. there is disclosed an aqueous solution formed by combining water, a silane coupling agent, and an alkoxysilane. The solution is used as a treating agent for cellulosic and masonry surfaces for rendering such surfaces water repellent. An improvement on the disclosure of Cuthbert et al. is claimed in U.S. Pat. No. 5,300,327 to Stark-Kasley et al. In this disclosure, a petroleum or synthetic wax is combined with the above mentioned silanes to provide improved water repellency to, e.g., wood or masonry. In order to achieve the most desirable results, an aqueous silicone resin emulsion is also included in the compositions taught by Stark-Kasley et al.

SUMMARY OF THE INVENTION

The invention relates to compositions and methods of treating cellulosic and masonry surfaces with aqueous emulsions of a combination of one or more alkoxysilanes, an amine or quaternary ammonium functional silane coupling agent and a polyisobutylene polymer. It has been found that the water exclusion and water repellency of surfaces treated with this combination is superior to those treated either with the above mentioned silane combination alone or with the polyisobutylene polymer alone. Furthermore, when the aqueous emulsion also includes a wax, such as a blend of petroleum and synthetic hydrocarbon waxes, cellulosic or masonry surfaces treated therewith exhibit water beading, a characteristic prized in many consumer-oriented applications. The latter compositions have been shown to impart high initial water exclusion and reduced water swell to, e.g., wood treated therewith. These indicia of water repellency were also retained after subsequent exposure to moisture. Such a combination of initial and sustained water repellency is an unexpected result based on the above cited prior art disclosures.

DETAILED DESCRIPTION OF THE INVENTION

A composition according to the present invention is in the form of an aqueous emulsion of (i) at least one alkoxysilane; (ii) at least one amine or quaternary ammonium functional silane coupling agent; and (iii) a polyisobutylene polymer or oligomer.

Component (i) of the invention is an alkoxysilane, or mixture of alkoxysilanes, of the general formula $$R_n Si(OR')_{4-n}$$

wherein R is independently selected from the group consisting of alkyl radical having 1 to 10 carbon atoms, preferably 1 to 6 carbons, alkenyl radicals having 2 to 8 carbon atoms, phenyl, chloropropyl and trifluoropropyl, n is 1 or 2 and R' is an alkyl radical having 1 to 6 carbon atoms. It is preferred that both R and R' are methyl radicals.

Suitable alkoxysilanes are compounds such as methyltrimethoxysilane, methyltriethoxysilane, methyltripropoxysilane, ethyltrimethoxysilane, ethyltributoxysilane, propyltrimethoxysilane, propyltriethoxysilane, isobutyltrimethoxysilane, butyltriethoxysilane, hexyltrimethoxysilane, dimethyldimethoxysilane, dimethyldiethoxysilane, diethyldimethoxysilane, diisobutyldimethoxysilane, phenyltrimethoxysilane, dibutyldiethoxysilane and dihexyldimethoxysilane.

Component (ii) is a silane coupling agent of the formula $$R''_m R'''_p Si(OR')_{4-m-p}$$

wherein R'' is selected from the group consisting of amino and quaternary ammonium organofunctional groups, R''' is an alkyl radical having 1 to 4 carbon atoms, R' has its previously defined meaning, m is 1 or 2 and p is 0 or 1, with the proviso that m+p is 2 or less. It is preferred that R' in the above formula is a methyl radical, R'' is selected from N-(2-aminoethyl)-3-aminopropyl or 3-aminopropyl groups and R''' is a methyl radical. In the above formula for component (ii) the counterion, typically a bromide or chloride ion, is not explicitly shown for the case when R'' is a quaternary ammonium organofunctional group.

Suitable silane coupling agents with amino organofunctionality are compounds such as N-(2-aminoethyl)-3-aminopropyltrimethoxysilane, N-(2-aminoethyl)-3-aminopropylmethyldimethoxysilane, N-(2-aminoethyl)-3-aminopropyltriethoxysilane, 3-aminopropyltrimethoxysilane, N-(aminoethylaminomethyl)-phenethyltrimethoxysilane, bis(2-hydroxyethyl)-3-aminopropyltrimethoxysilane, trimethoxysilylpropyldiethylenetriamine, and 3-aminopropylmethyldimethoxysilane.

Suitable silane coupling agents with quaternary ammonium organofunctionality are compounds represented by the following formulas, wherein the counter ion is now explicitly shown and Me, Et and Ph hereinafter denote methyl radical, ethyl radical and phenyl radical, respectively:

| | |
|---|---|
| (MeO)$_3$SiCH$_2$CH$_2$CH$_2$N$^+$(Me)$_2$C$_{18}$H$_{37}$ | X$^-$ |
| (MeO)$_3$SiCH$_2$CH$_2$CH$_2$N$^+$(Me)$_2$C$_{10}$H$_{21}$ | X$^-$ |
| (MeO)$_3$SiCH$_2$CH$_2$CH$_2$N$^+$(Me)$_3$ | X$^-$ |
| (MeO)$_3$SiCH$_2$CH$_2$CH$_2$N$^+$(Me)$_2$C$_4$H$_9$ | X$^-$ |
| (MeO)$_3$SiCH$_2$CH$_2$CH$_2$N$^+$(Me)$_2$CH$_2$Ph | X$^-$ |
| (MeO)$_3$SiCH$_2$CH$_2$CH$_2$N$^+$(Me)$_2$CH$_2$CH$_2$OH | X$^-$ |
| (MeO)$_3$SiCH$_2$CH$_2$CH$_2$N$^+$(Et)$_3$ | X$^-$ |
| (MeO)$_3$SiCH$_2$CH$_2$CH$_2$N$^+$(Ph)$_3$ | X$^-$ |
| (EtO)$_3$SiCH$_2$CH$_2$CH$_2$N$^+$(Me)$_2$C$_{18}$H$_{37}$ | X$^-$ |
| (MeO)$_3$SiCH$_2$CH$_2$CH$_2$N$^+$(Me)$_2$CH$_2$CH$_2$O—C(O)C(Me)=CH$_2$ | X$^-$ |
| (MeO)$_3$SiCH$_2$CH$_2$CH$_2$N$^+$(Me)$_2$CH$_2$CH$_2$CH$_2$NHC(O)(CF$_2$)$_6$CF$_3$ | X$^-$ | in which the counterion X is either Br or Cl. Of these, the structure (MeO)$_3$SiCH$_2$CH$_2$CH$_2$N$^+$(Me)$_2$C$_{18}$H$_{37}$ Cl$^-$ is preferred.

For the purposes of the present invention, silanes (i) and (ii) are employed in a molar ratio of about 0.5:1 to 3:1, respectively, preferably in a ratio of 1:1 to 1.5:1. These silanes may be introduced as a cold blend, but are preferably first reacted with limited water (i.e., less than stoichiometric) to form a partial hydrolyzate. This partial hydrolyzate contains an alcohol (i.e., R'OH) formed as a byproduct of the hydrolysis reaction and may be used to form the emulsion of the invention, described infra, without further modification. Alternatively, the alcohol may be stripped out prior to preparation of the emulsion when a composition having a low volatile organic compound (VOC) content is desired.

When the alkoxysilane is reacted with a silane coupling agent containing a reactive amino group or quaternary ammonium group, the reaction product may then be cold blended with another silane coupling agent having either an amino or quaternary ammonium reactive organofunctional group, if desired.

Component (iii) of the invention is a polyisobutylene polymer or oligomer having a number average molecular weight (MW) of about 200 to about 2,300, preferably less than about 1,500 and most preferably less than about 1,000. Such polymers and oligomers are known in the art and many are available commercially in a variety of molecular weights and end group combinations. It has been found that the relatively low molecular weight polyisobutylenes (i.e., MW<1,000) having terminal groups which can hydrogen bond to the hydroxyl groups generally found on cellulosic or masonry substrates provide particularly superior water repellent treating compositions in accord with the present invention. Thus, preferred polyisobutylene polymers have at least one terminal group which contain a functional group such as epoxy, halide, alkoxyphenylene, hydroxyl, carboxyl, chlorosilyl, isocyanato, amino or amido. A highly preferred end group in this regard is the epoxy group. Again, these specific polymers and oligomers can be prepared by methods known in the art.

In order to form the compositions of the present invention, an aqueous emulsion of component (i) through (iii) is formed by methods well known in the art. For example, an aqueous emulsion of the polyisobutylene may first be prepared by mixing this component with water and a sufficient amount of a non-ionic or anionic surfactant and then subjecting this combination to high shear, as in a homogenizer or sonolator, to result in a stable emulsion. This emulsion is then thoroughly mixed with components (i) and (ii) or, preferably, the above mentioned partial hydrolyzate of (i) and (ii). For the purposes herein, from about 10 parts by weight to about 300 parts by weight of component (iii) is used for each 100 parts of the combined weights of component (i) and (ii) employed. Preferably, from 30 to 150 parts of (iii) are used for each 100 parts of (i) plus (ii), the above proportions being taken on a solids basis (i.e., active ingredients; excluding solvent and water). The aqueous emulsion so formed should contain from 5 to 25 percent by weight (solids basis) of the combination of alkoxysilane (i), silane coupling agent (ii) and polyisobutylene (iii), preferably from 7.5 to 25 weight percent.

In preferred embodiments of the present invention, and wherein water beading on the treated surface is desired, a wax (iv) is added to the above described emulsion. This can be accomplished, for example, by first preparing an aqueous emulsion of the wax and adding this to the emulsion of components (i) through (iii), although the order of mixing is not critical. Component (iv) is preferably carnuba wax or a blend of petroleum and synthetic waxes, more particularly a blend which includes both paraffin and polyethylene waxes. The polyethylene waxes can be high or low density polyethylene waxes, or mixtures of high and low density polyethylene waxes. An exemplary wax and a wax found to be especially suitable in accordance with the present invention, is JONWAX ® 120, a product and a trademark of S.C. Johnson & Sons Inc. of Racine, Wisconsin USA. This wax is sold in the form of an aqueous emulsion of polyethylene and paraffin waxes with a solids content of about thirty-five percent. Other blended paraffin and polyethylene type waxes can also be employed.

When included in the compositions of the present invention, the wax (iv) is added at a level of about 5 to 1,500 parts by weight for each 100 parts of the combined weights of components (i) and (ii), preferably 200 to 600 parts by weight. When the wax is included in the compositions of the invention, the total solids content of the emulsions should be about 7.5 to 30 percent by weight, preferably 7.5 to 15 weight percent.

The emulsion compositions of the present invention find utility as water repellent treatments for cellulosic and masonry surfaces and may be used in a manner similar to that described in the prior art (e.g., see above cited patents to Cuthbert et al. and Stark-Kasley et al.), and as illustrated in the examples, infra. Thus, they may be applied by brushing, pouring, spraying, roller coating, dipping, or doctor blading techniques, inter alia. After application to a given substrate in an amount sufficient to thoroughly coat the surface thereof and impart water repellent character thereto, the composition is preferably cured by exposure to ambient moisture for several days. Optimum amounts and cure conditions are readily determined by routine experimentation by one skilled in the art.

EXAMPLES

The following examples are presented to further illustrate the composition and method of this invention, but are not to be construed as limiting the invention, which is delineated in the appended claims. All parts and percentages in the examples are on a weight basis and all measurements were obtained at 25° C., unless indicated to the contrary.

Sample preparation

Aqueous emulsion treating compositions were prepared by blending the components shown in the second column of Table 1 at the indicated solids levels. The components used were as follows.

MTMS/AFS is a partial hydrolyzate prepared by reacting 36 parts of methyltrimethoxysilane (MTMS) and 58 parts of N-(beta-aminoethyl)-gamma-aminopropyltrimethoxysilane (AFS) (i.e., molar ratio of MTMS:AFS=1.5:1) with 6 parts of water while maintaining the temperature below 50° C. and stripping out the by-product methanol.

Jonwax ® 120 is a product of S.C. Johnson & Sons Inc. of Racine, Wisconsin USA and is described as a water emulsion of polyethylene and paraffin waxes with a solids content of about thirty-five percent.

The abbreviation "PIB" in the examples represents various polyisobutylene (also referred to as polybutene) products of the Amoco Chemical Company, Chicago, Ill. Thus, E-6 is described as an epoxy-terminated polyisobutylene having a number average molecular weight of about 365. E-16 is described as an epoxy-terminated polyisobutylene having a number average molecular weight of about 975. E-23 is described as an epoxyterminated polyisobutylene having a number average molecular weight of about 1,433. L-14 is described as a vinyl-terminated polyisobutylene having a number average molecular weight of about 300.

In the examples, the PIB was first emulsified by running a mixture of 55% PIB, 42% deionized water and 3% Tergitol® TMN-6 (trimethylnonylphenyl poly(ethylene oxide); Union Carbide Chemical & Plastics Division, Danbury, Ct.) through a microfluidizer until a constant particle size was achieved (at least 4 passes).

The MTMS/AFS hydrolyzate, Jonwax® 120 emulsion and PIB emulsions were blended and diluted with water to provide the treatment emulsions shown in Table 1. It was noted, however, that the partial silane hydrolyzate alone formed a solution when so diluted rather than an emulsion at the 2.5% solids concentration employed (Example 1).

Test Procedures (Wood)

The emulsions shown in Table 1 were used to treat wood samples which were then subjected to water repellency testing according to two different procedures, as described infra.

Water repellency using a "Swellometer" Test for wood, according to Federal Specification TT-W-572B, employed wafers cut from straight grained, clear, average density, flat grained, kiln dried, ponderosa pine sapwood. The wood was machined to 1.5 inches by 10 inches and wafers having a thickness of ¼ inch were cut therefrom. All wood pieces were conditioned at 50%±5% relative humidity and 70° F.±5° F. until a constant weight was reached. An untreated sample, selected from a consecutive piece of the wood in each case, served as a control for each treated sample. Treated pieces were soaked for three minutes in the water-based repellent compositions and then air dried at ambient conditions for one day, whereupon they were returned to the conditioning room for six days. When a sample attained constant weight, it was tested for swell in a Swellometer (basically, an apparatus for the precise determination of change in length of the sample) in accordance with American Society for Testing and Materials standard ASTM 4446-84. Treated and untreated pieces were placed in Swellometers and submerged in deionized water for thirty minutes. The swell of each piece of wood was recorded after a 30 minute soak period. The percent swell in the longitudinal direction (% WS) was calculated as: 100 X (swell control - swell treated piece)/(swell control), these values being reported in the fourth column of Table 1. It should be apparent that the value for the untreated controls is zero by definition, this being applicable for all the similarly calculated results relating to Swellometer and Gravimetric testing described infra.

In addition, the Swellometer samples were weighed before and after the above described water exposure and the water exclusion relative to control samples (% WE) was calculated as: 100 X (wt. control - wt. treated piece)/(weight control), these values being reported in parentheses in the fourth column of Table 1. The above % WS and % WE values represent initial swell and water exclusion values and are designated as "TEST I" in Table 1. In a variation, the above testing was continued by allowing the samples to equilibrate at 50% humidity for an additional week. The 30 minute soak was repeated, and the % WS and % WE values again determined (TEST II in Table 1). This was repeated yet a third time (TEST III in Table 1) if the variation between TEST I and TEST II was significant (i.e., if the measurements differed by at least 10%).

In a gravimetric water absorption test method, standard 2"×4" knot-free pine boards were cut into six inch lengths and allowed to equilibrate in a 50% relative humidity atmosphere. The boards were treated with the water repellent composition by either brushing until they were saturated or by soaking the boards in the composition for three minutes. The treated boards were allowed to cure for one day at ambient conditions and allowed to float in the 50% humidity room for six days to completely cure and condition the sample. An untreated control board was kept in a fifty percent humidity room during the cure process. After cure, the boards (including the control board) were weighed and placed in room temperature water for 15 minutes, turned over and allowed to float in the water for an additional 15 minutes. All of the boards were weighed and the water uptake was calculated (TEST I). The percent water exclusion was computed as the water uptake of the control board minus the water uptake of the treated board, multiplied by one hundred, and divided by the water uptake of the control board. The results of this procedure are presented in the last column of Table 1, wherein data of repeat testing after additional conditioning for one week at 50% humidity (TEST II) and additional conditioning for yet another week (TEST III) are also presented.

TABLE 1

WATER REPELLENT PERFORMANCE ON WOOD: SWELLOMETER TEST AND GRAVIMETRIC TEST

| EXAMPLE | TREATMENT (% in solids) | TEST | SWELLOMETER (% WS) (% WE) | GRAVIMETRIC TEST (%) |
|---|---|---|---|---|
| 1 | 2.5% MTMS/AFS | I | −4.7 (15.4) | 52%* |
| 2 | 5% Jonwax ® | I | −25.2 (36.8) | 82 |
| 3 | 2.5% PIB (E-16) | I | 1.4 (22.2) | 21.9 |
|  |  | II | 2.4 (13.8) | 26.2 |
| 4 | 2.5% PIB (E-16) | I | 4.0 (23.9) | 62.2 |
|  | 5% Jonwax ® | II | −5.3 (33.7) | 60.2 |
| 5 | 2.5% MTMS/AFS | I | 13.6 (48.9) | 87.4 |
|  | 5% Jonwax ® | II | 40.4 (67.6) | 88.2 |
|  |  | III | 39.8 (67.4) | 88.7 |
| 6 | 2.5% MTMS/AFS | I | 7.1 (38.0) | 66.8 |
|  | 2.5% PIB (E-16) | II | 12.1 (35.5) | 52.4 |
|  |  | III | — | 58.2 |
| 7 | 2.5% MTMS/AFS | I | 34.5 (70.9) | 66.0** |
|  | 5% Jonwax ® | II | 34.8 (64.7) | — |
|  | 2.5% PIB (E-6) |  |  |  |

TABLE 1-continued

WATER REPELLENT PERFORMANCE ON WOOD: SWELLOMETER TEST AND GRAVIMETRIC TEST

| EXAMPLE | TREATMENT (% in solids) | TEST | SWELLOMETER (% WS) (% WE) | GRAVIMETRIC TEST (%) |
|---|---|---|---|---|
| 8 | 2.5% MTMS/AFS | I | 46.1 (68.4) | 80.2** |
|   | 5% Jonwax ® | II | 45.8 (64.2) | — |
|   | 2.5% PIB (E-16) | | | |
| 9 | 3.75% MTMS/AFS | I | 29.0 (62.6) | 82.5 |
|   | 1.25% PIB (E-23) | II | 40.8 (67.8) | 77.7 |
|   | 5% Jonwax ® | III | 34.8 (60.1) | 77.6 |
| 10 | 3.75% MTMS/AFS | I | 10.3 (53.4) | 82.6 |
|   | 1.25% PIB (L-14) | II | 12.6 (58.6) | 82.2 |
|   | 5% Jonwax ® | | | |
| 11 | 1.25% MTMS/AFS | I | 13.8 (59.3) | 61.8 |
|   | 3.75% PIB (E-23) | II | 38.6 (58.6) | 50.8 |
|   | 5% Jonwax ® | III | 30.1 (62.0) | 50.7 |
| 12 | 1.25% MTMS/AFS | I | 4.7 (40.0) | 49.4 |
|   | 3.75% PIB (L-14) | II | 5.0 (38.3) | 50.6 |
|   | 5% Jonwax ® | | | |

*Tested at 15% solids.
**Different lot of wood tested.

It is seen from the above table that the compositions of the present invention provide improved water exclusion or water swell (i.e., larger values of WE%, WS% of the Swellometer test and % exclusion of the gravimetric test) than the silane mixture alone, the wax alone or the PIB alone. Furthermore, higher initial values of % WS and % WE were obtained for compositions of the invention containing wax (Examples 7 and 8) relative to a comparable composition (Example 5) which did not contain PIB. Additionally, these values did not drift much from the initial ones when the tests were repeated (i.e., TEST II, etc.).

Test Procedures (Masonry)

The emulsion composition of Example 7 was used to treat sandstone and mortar samples according to Federal Test Method SS-W-110C to compare water absorption relative to untreated samples which were maintained at ambient conditions. Mortar samples were in the form of cubes, two inches on a side; sandstone samples were 1"×1"×4" Briar Hill Sandstone pieces. The mortar and sandstone pieces were wire-brushed and blown clean with high pressure air.

Sandstone samples were treated by dipping in the emulsion composition for about 10 seconds followed by cure at ambient conditions. Weighed sandstone samples (treated and control) were soaked in a tray containing water to a depth of about ¼ inch, re-weighed and the water exclusion (% WE), relative to untreated control, was calculated using an average of three determinations:

(% WE) = 100×(wt. control - wt. treated piece)/(weight control). When the above mentioned cure time was 2 day and the soak time was 72 hours, the value of (% WE) was 12.4%; after cure for 7 days and soak for 72 hours, this value was 14.6%. When the above samples were dried at ambient atmosphere for 10 days and retested by soaking for 96 hours, the (% WE) was 95.6%. Similarly, when these samples were dried at ambient atmosphere for 2 days and re-tested by soaking for 72 hours, the (% WE) was 66.5%.

Mortar samples were treated in a similar manner, but required longer dip times to obtain satisfactory water repellent character (i.e., dipped repeatedly until about 4 grams of treatment were absorbed by the sample). After a 7 day cure and a 72 hour soak, the (% WE) was 44.8%.

That which is claimed is:

1. An aqueous emulsion comprising:
(i) an alkoxysilane of the formula $$R_nSi(OR')_{4-n}$$

wherein R is selected from the group consisting of alkyl radicals having 1 to 10 carbon atoms, alkenyl radicals having 2 to 8 carbon atoms, phenyl, chloropropyl and trifluoropropyl, n is 1 or 2 and R' is an alkyl radical having 1 to 6 carbon atoms;
(ii) a silane coupling agent of the formula $$R''_mR'''_pSi(OR')_{4-m-p}$$

wherein R" is selected from the group consisting of amino and quaternary ammonium organofunctional groups, R''' is an alkyl radical having 1 to 4 carbon atoms, R' has its previously defined meaning, m is 1 or 2 and p is 0 or 1, with the proviso that m+p is 2 or less and molar ratio of said alkoxysilane (i) to said silane coupling agent (ii) is 0.5:1 to 3:1; and
(iii) a polyisobutylene polymer, wherein from 10 to 300 parts by weight of said polyisobutylene polymer (iii) are used for each 100 parts by weight of said component (i) plus component (ii).

2. The emulsion according to claim 1, wherein n of said alkoxysilane (i) is 1, m of said coupling agent (ii) is 1 and R' of components (i) and (ii) is methyl.

3. The emulsion according to claim 2, wherein R of said alkoxysilane (i) is an alkyl group having 1 to 6 carbon atoms and R" of said coupling agent (ii) is selected from the group consisting of N-(2-aminoethyl)-3-aminopropyl group and 3-aminopropyl group.

4. The emulsion according to claim 3, wherein the molecular weight of said polyisobutylene (iii) is less than 1,000.

5. The emulsion according to claim 4, wherein said polyisobutylene (iii) has at least one epoxy terminal group and the R group of said alkoxysilane (i) is methyl.

6. The emulsion according to claim 1, wherein the molecular weight of said polyisobutylene (iii) is less than 1,000.

7. The emulsion according to claim 6, wherein said polyisobutylene (iii) has at least one epoxy terminal group.

8. An aqueous emulsion comprising:

(i) an alkoxysilane of the formula

wherein R is selected from the group consisting of alkyl radicals having 1 to 10 carbon atoms, alkenyl radicals having 2 to 8 carbon atoms, phenyl, chloropropyl and trifluoropropyl, n is 1 or 2 and R' is an alkyl radical having 1 to 6 carbon atoms;

(ii) a silane coupling agent of the formula

wherein R" is selected from the group consisting of amino and quaternary ammonium organofunctional groups, R'" is an alkyl radical having 1 to 4 carbon atoms, R' has its previously defined meaning, m is 1 or 2 and p is 0 or 1, with the proviso that m+p is 2 or less and the molar ratio of said alkoxysilane (i) to said silane coupling agent (ii) is 0.5:1 to 3:1;

(iii) a polyisobutylene polymer, wherein from 10 to 300 parts by weight of said polyisobutylene polymer (iii) are used for each 100 parts by weight of said component (i) plus component (ii); and (iv) a wax, wherein from 5 to 1,500 parts by weight of said wax (iv) are used for each 100 parts by weight of said component (i) plus component (ii).

9. The emulsion according to claim 8, wherein n of said alkoxysilane (i) is 1, m of said coupling agent (ii) is 1, R' of components (i) and (ii) is methyl and said wax (iv) is a blend of petroleum and synthetic waxes.

10. The emulsion according to claim 9, wherein R of said alkoxysilane (i) is an alkyl group having 1 to 6 carbon atoms and R" of said coupling agent (ii) is selected from the group consisting of N-(2-aminoethyl)-3-aminopropyl group and 3-aminopropyl group.

11. The emulsion according to claim 10, wherein the molecular weight of said polyisobutylene (iii) is less than 1,000.

12. The emulsion according to claim 11, wherein said polyisobutylene (iii) at least one epoxy terminal group and the R group of said alkoxysilane (i) is methyl.

13. The emulsion according to claim 9, wherein the molecular weight of said polyisobutylene (iii) is less than 1,000.

14. The emulsion according to claim 13, wherein said polyisobutylene (iii) at least one epoxy terminal group.

15. A method for treating a surface in order to render the surface water repellent, said method comprising applying to said surface the emulsion of claim 1.

16. A method for treating a surface in order to render the surface water repellent, said method comprising applying to said surface the emulsion of claim 3.

17. A method for treating a surface in order to render the surface water repellent, said method comprising applying to said surface the emulsion of claim 5.

18. A method for treating a surface in order to render the surface water repellent, said method comprising applying to said surface the emulsion of claim 9.

19. A method for treating a surface in order to render the surface water repellent, said method comprising applying to said surface the emulsion of claim 10.

20. A method for treating a surface in order to render the surface water repellent, said method comprising applying to said surface the emulsion of claim 12.

* * * * *

UNITED STATES PATENT AND TRADEMARK OFFICE
CERTIFICATE OF CORRECTION

PATENT NO. : 5,421,866

DATED : June 6, 1995

INVENTOR(S) : Stark-Kasley, et al

It is certified that error appears in the above-identified patent and that said Letters Patent is hereby corrected as shown below:

Col. 8:

In claim 1, line 10, delete

"$R''_M R'''_p Si(OR')_{4-m-p}$" and substitute

-- $R''_m R'''_p Si(OR')_{4-m-p}$ --.

Col. 10:

In claim 12, line 2, insert --has-- between "(iii)" and "at."

Col. 10:

In claim 14, line 2, insert --has-- between "(iii)" and "at."

Signed and Sealed this

Sixteenth Day of January, 1996

Attest:

BRUCE LEHMAN

Attesting Officer   Commissioner of Patents and Trademarks